US009313553B2

(12) United States Patent
Sridhar et al.

(10) Patent No.: US 9,313,553 B2
(45) Date of Patent: *Apr. 12, 2016

(54) APPARATUS AND METHOD FOR SIMULCAST OVER A VARIABLE BANDWIDTH CHANNEL (71) Applicant: THOMSON LICENSING, Issy de Moulineaux (FR)

(72) Inventors: Avinash Sridhar, Pennington, NJ (US); David Anthony Campana, Kirkland, WA (US); Shemimon Manalikudy Anthru, Dayton, NJ (US); Jill MacDonald Boyce, Manalapan, NJ (US)

(73) Assignee: THOMSON LICENSING, Issy les-Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/852,290

(22) Filed: Mar. 28, 2013

(65) Prior Publication Data

US 2013/0219440 A1    Aug. 22, 2013

Related U.S. Application Data (62) Division of application No. 12/735,008, filed as application No. PCT/US2007/025685 on Dec. 14, 2007, now abandoned.

(51) Int. Cl.
*H04N 5/445* (2011.01)
*H04N 7/173* (2011.01)
(Continued)

(52) U.S. Cl.
CPC ............ *H04N 21/65* (2013.01); *H04L 12/1822* (2013.01); *H04L 41/147* (2013.01);
(Continued)

(58) Field of Classification Search
CPC ............ H04N 21/435; H04N 7/17318; H04N 21/47202; H04L 29/06027
USPC .......................... 725/93–96, 116, 54; 709/217
See application file for complete search history.

(56) References Cited

U.S. PATENT DOCUMENTS 5,202,755 A    4/1993 Yang et al.
5,627,970 A    5/1997 Keshav
(Continued)

FOREIGN PATENT DOCUMENTS

CN    1647517    7/2005
CN    1708985    12/2005
(Continued)

OTHER PUBLICATIONS

Pu et al: "Fine-Grain Adaptive Compression in Dynamically Variable Networks"; Proceedings of the 25th IEEE Int'l Conference on Distributed Computed Systems (ICSCS'05) 2005 IEEE Jun. 6, 2005, pp. 1-10.

(Continued)

*Primary Examiner* — Nathan Flynn
*Assistant Examiner* — Sumaiya A Chowdhury
(74) *Attorney, Agent, or Firm* — Robert D. Shedd; Reitseng Lin (57) ABSTRACT

A method comprising the steps of outputting periodically a schedule for a transmission of a plurality of multimedia contents to a client receiver over a unidirectional data communication channel; transmitting said schedule to said client receiver over said communication channel before said transmission of said plurality of multimedia contents, said schedule including a metadata indicating a plurality of broadcast times for respective ones of said plurality of multimedia contents for selectively activating said client receiver in accordance with said plurality of broadcast times; estimating first and second available bandwidths of said communication channel at respective ones of first and second points in time; selecting one multimedia content file of a given compression level for transmission in response to a change of available bandwidth of said communication channel between said first and second points in time so that said plurality of multimedia contents may be received at said client receiver in accordance with respective ones of said plurality of broadcast times; and transmitting said selected multimedia content file to said client receiver.

6 Claims, 5 Drawing Sheets (51) Int. Cl.

| | | |
|---|---|---|
| *H04N 21/65* | (2011.01) | |
| *H04L 12/18* | (2006.01) | |
| *H04L 12/24* | (2006.01) | |
| *H04L 12/801* | (2013.01) | |
| *H04N 21/2343* | (2011.01) | |
| *H04N 21/24* | (2011.01) | |
| *H04N 21/61* | (2011.01) | |
| *H04N 21/6405* | (2011.01) | |
| *H04L 29/06* | (2006.01) | |
| *H04L 29/08* | (2006.01) | |

(52) U.S. Cl.
CPC ............ *H04L 47/10* (2013.01); *H04L 65/4076* (2013.01); *H04L 67/28* (2013.01); *H04L 67/2828* (2013.01); *H04L 67/325* (2013.01); *H04N 21/23439* (2013.01); *H04N 21/2402* (2013.01); *H04N 21/6131* (2013.01); *H04N 21/6405* (2013.01)

(56) References Cited

U.S. PATENT DOCUMENTS

| | | |
|---|---|---|
| 5,675,384 A | 10/1997 | Ramamurthy et al. |
| 5,802,106 A | 9/1998 | Packer |
| 5,892,915 A | 4/1999 | Duso et al. |
| 5,974,503 A | 10/1999 | Venkatesh et al. |
| 5,987,621 A | 11/1999 | Duso et al. |
| 6,014,694 A | 1/2000 | Aharoni et al. |
| 6,026,082 A | 2/2000 | Astrin |
| 6,230,200 B1 | 5/2001 | Forecast et al. |
| 6,275,990 B1 | 8/2001 | Dapper et al. |
| 6,289,382 B1 | 9/2001 | Bowman-Amuah |
| 6,298,456 B1 * | 10/2001 | O'Neil et al. .................... 714/48 |
| 6,332,163 B1 | 12/2001 | Bowman-Amuah |
| 6,339,832 B1 | 1/2002 | Bowman-Amuah |
| 6,356,945 B1 | 3/2002 | Shaw et al. |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,473,794 B1 | 10/2002 | Guheen et al. |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,213 B1 | 12/2002 | Bowman-Amuah |
| 6,507,872 B1 | 1/2003 | Guheen et al. |
| 6,519,571 B1 | 2/2003 | Guheen et al. |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,611,812 B2 | 8/2003 | Hurtado et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,625,750 B1 | 9/2003 | Duso et al. |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,697,365 B1 | 2/2004 | Messenger |
| 6,715,145 B1 | 3/2004 | Bowman-Amuah |
| 6,721,437 B1 | 4/2004 | Ezaki et al. |
| 6,721,713 B1 | 4/2004 | Guheen et al. |
| 6,725,267 B1 | 4/2004 | Hoang |
| 6,742,015 B1 | 5/2004 | Bowman-Amuah |
| 6,834,110 B1 | 12/2004 | Marcancini et al. |
| 6,842,906 B1 | 1/2005 | Bowman-Amuah |
| 6,901,051 B1 | 5/2005 | Hou et al. |
| 6,957,186 B1 | 10/2005 | Guheen et al. |
| 6,983,371 B1 | 1/2006 | Hurtado et al. |
| 7,110,984 B1 | 9/2006 | Lamkin et al. |
| 7,149,698 B2 | 12/2006 | Guheen et al. |
| 7,165,041 B1 | 1/2007 | Guheen et al. |
| 7,177,429 B2 | 2/2007 | Moskowitz et al. |
| 7,188,085 B2 | 3/2007 | Pelletier |
| 7,213,005 B2 | 5/2007 | Mourad et |
| 7,219,145 B2 | 5/2007 | Chmaytelli et al. |
| 7,228,437 B2 | 6/2007 | Spagna et al. |
| 7,260,309 B2 | 8/2007 | Gutta |
| 7,269,564 B1 | 9/2007 | Milsted |
| 7,310,823 B2 | 12/2007 | Okamoto |
| 7,478,206 B2 | 1/2009 | Nakamura et al. |
| 7,568,079 B2 | 7/2009 | Horiuchi et al. |
| 8,081,955 B2 | 12/2011 | Davis et al. |
| 8,433,181 B2 | 4/2013 | Jeong et al. |
| 2001/0044835 A1 * | 11/2001 | Schober et al. ............... 709/217 |
| 2002/0010684 A1 | 1/2002 | Moskowitz |
| 2002/0013156 A1 | 1/2002 | Yamamoto et al. |
| 2002/0026501 A1 | 2/2002 | Hoang |
| 2002/0078357 A1 | 6/2002 | Bruekers et al. |
| 2002/0175998 A1 | 11/2002 | Hoang |
| 2003/0007507 A1 | 1/2003 | Rajwan et al. |
| 2003/0051249 A1 | 3/2003 | Hoang |
| 2003/0058277 A1 | 3/2003 | Bowman-Amuah |
| 2003/0105718 A1 | 6/2003 | Hurtado et al. |
| 2003/0135464 A1 | 7/2003 | Mourad et al. |
| 2003/0195863 A1 | 10/2003 | Marsh |
| 2003/0225777 A1 | 12/2003 | Marsh |
| 2003/0229549 A1 | 12/2003 | Wolinsky et al. |
| 2004/0003413 A1 | 1/2004 | Boston et al. |
| 2004/0034712 A1 | 2/2004 | Rajwan et al. |
| 2004/0045030 A1 | 3/2004 | Reynolds et al. |
| 2004/0052504 A1 | 3/2004 | Yamada et al. |
| 2004/0091235 A1 | 5/2004 | Gutta |
| 2004/0092228 A1 | 5/2004 | Force et al. |
| 2004/0107125 A1 | 6/2004 | Guheen et al. |
| 2004/0148631 A1 | 7/2004 | Zubowicz |
| 2004/0163121 A1 | 8/2004 | Hyun |
| 2004/0250291 A1 | 12/2004 | Rao et al. |
| 2005/0135779 A1 | 6/2005 | Garrison et al. |
| 2005/0144284 A1 | 6/2005 | Ludwig et al. |
| 2005/0229222 A1 | 10/2005 | Relan et al. |
| 2005/0238315 A1 | 10/2005 | Kataoka |
| 2005/0240756 A1 | 10/2005 | Mayer |
| 2005/0259682 A1 | 11/2005 | Yosef et al. |
| 2005/0289616 A1 | 12/2005 | Horiuchi et al. |
| 2005/0289635 A1 | 12/2005 | Nakamura et al. |
| 2006/0047775 A1 | 3/2006 | Bruck et al. |
| 2006/0053077 A1 | 3/2006 | Mourad et al. |
| 2006/0064716 A1 | 3/2006 | Sull et al. |
| 2006/0085343 A1 | 4/2006 | Lisanke et al. |
| 2006/0095792 A1 | 5/2006 | Hurtado et al. |
| 2006/0095944 A1 | 5/2006 | Demircin et al. |
| 2006/0107289 A1 | 5/2006 | DeYonker et al. |
| 2006/0159109 A1 | 7/2006 | Lankin et al. |
| 2006/0161635 A1 | 7/2006 | Lankin et al. |
| 2006/0161949 A1 | 7/2006 | Tsukamoto |
| 2006/0184977 A1 | 8/2006 | Mueller et al. |
| 2006/0218218 A1 | 9/2006 | Ganesan et al. |
| 2006/0242091 A1 | 10/2006 | Jansky |
| 2006/0242672 A1 | 10/2006 | Narayanan et al. |
| 2006/0285508 A1 | 12/2006 | Vermola et al. |
| 2007/0016927 A1 | 1/2007 | Robey et al. |
| 2007/0104457 A1 | 5/2007 | Jeong et al. |
| 2007/0128899 A1 | 6/2007 | Mayer |
| 2007/0130023 A1 | 6/2007 | Wolinsky et al. |
| 2007/0130589 A1 | 6/2007 | Davis et al. |
| 2007/0153731 A1 | 7/2007 | Fine |
| 2007/0153910 A1 | 7/2007 | Levett |
| 2007/0192482 A1 | 8/2007 | Smith et al. |
| 2007/0201823 A1 | 8/2007 | Kang |
| 2007/0211720 A1 | 9/2007 | Fuchs et al. |
| 2007/0237402 A1 | 10/2007 | Dekel et al. |
| 2008/0040760 A1 | 2/2008 | Cho et al. |
| 2009/0204992 A1 | 8/2009 | Boyce et al. |

(56) References Cited

U.S. PATENT DOCUMENTS

| | | |
|---|---|---|
| 2010/0130122 A1 | 5/2010 | Sridhar et al. |
| 2010/0138870 A1 | 6/2010 | Anthru et al. |
| 2010/0138871 A1 | 6/2010 | Anthru et al. |
| 2010/0257572 A1 | 10/2010 | Sridhar et al. |
| 2010/0278178 A1 | 11/2010 | Sridhar et al. |
| 2013/0219440 A1 | 8/2013 | Sridhar et al. |

FOREIGN PATENT DOCUMENTS

| | | |
|---|---|---|
| CN | 1723474 | 1/2006 |
| CN | 1751470 | 3/2006 |
| EP | 1077398 | 2/2001 |
| EP | 1107137 | 6/2001 |
| EP | 1487204 | 12/2004 |
| EP | 1622341 | 2/2006 |
| EP | 1693981 | 8/2006 |
| EP | 1909283 | 4/2008 |
| GB | 2405557 | 3/2005 |
| GB | 2434463 | 7/2007 |
| JP | 8022653 | 1/1996 |
| JP | 2000228081 | 8/2000 |
| JP | 2003046974 | 2/2003 |
| JP | 2003085880 | 3/2003 |
| JP | 200448718 | 2/2004 |
| JP | 2004/516693 | 6/2004 |
| JP | 2004220696 | 8/2004 |
| JP | 2004533781 | 11/2004 |
| JP | 2004350316 | 12/2004 |
| JP | 2005346824 | 12/2005 |
| JP | 2006053633 | 2/2006 |
| JP | 2006054022 | 2/2006 |
| JP | 2006505994 | 2/2006 |
| JP | 2006115224 | 4/2006 |
| JP | 2006129265 | 5/2006 |
| JP | 2007110395 | 4/2007 |
| JP | 2007110395 A | 4/2007 |
| JP | 2007/274066 | 10/2007 |
| JP | 2007274443 | 10/2007 |
| JP | 2007274443 A | 10/2007 |
| JP | 2007/312365 | 11/2007 |
| KR | 20010020498 | 3/2001 |
| KR | 20040061254 | 7/2004 |
| KR | 20070063086 | 6/2007 |
| WO | WO9401824 | 1/1994 |
| WO | WO9900984 | 1/1999 |
| WO | WO0007314 | 2/2000 |
| WO | WO0051310 | 8/2000 |
| WO | WO0073928 | 12/2000 |
| WO | WO0073929 | 12/2000 |
| WO | WO0073930 | 12/2000 |
| WO | WO0073955 | 12/2000 |
| WO | WO0073956 | 12/2000 |
| WO | WO0073957 | 12/2000 |
| WO | WO0073958 | 12/2000 |
| WO | WO0116668 | 3/2001 |
| WO | WO0116704 | 3/2001 |
| WO | WO0116705 | 3/2001 |
| WO | WO0116706 | 3/2001 |
| WO | WO0116723 | 3/2001 |
| WO | WO0116724 | 3/2001 |
| WO | WO0116726 | 3/2001 |
| WO | WO0116728 | 3/2001 |
| WO | WO0116729 | 3/2001 |
| WO | WO0116733 | 3/2001 |
| WO | WO0116734 | 3/2001 |
| WO | WO0116739 | 3/2001 |
| WO | WO0117139 | 3/2001 |
| WO | WO0117194 | 3/2001 |
| WO | WO0117195 | 3/2001 |
| WO | WO0143026 | 6/2001 |
| WO | WO0146846 | 6/2001 |
| WO | WO0157667 | 8/2001 |
| WO | WO-0189176 | 11/2001 |
| WO | WO0193060 | 12/2001 |
| WO | WO0203682 | 1/2002 |
| WO | WO0211364 | 2/2002 |
| WO | WO0239744 | 5/2002 |
| WO | WO02039744 | 5/2002 |
| WO | WO02087246 | 10/2002 |
| WO | WO02104028 | 12/2002 |
| WO | WO03027876 | 4/2003 |
| WO | WO03043204 | 5/2003 |
| WO | WO03048894 | 6/2003 |
| WO | WO-2004/045104 | 5/2004 |
| WO | WO2004053757 | 6/2004 |
| WO | WO2004063892 | 7/2004 |
| WO | WO2004107747 | 12/2004 |
| WO | WO2005015913 | 2/2005 |
| WO | WO2005022791 | 3/2005 |
| WO | WO2005032026 | 4/2005 |
| WO | WO2006066052 | 6/2006 |
| WO | WO2007078252 | 7/2007 |
| WO | WO2007078253 | 7/2007 |
| WO | WO-2008/033136 | 3/2008 |
| WO | WO-2008/147367 | 12/2008 |
| WO | 2009020492 A2 | 2/2009 |
| WO | WO-2009/020493 | 2/2009 |

OTHER PUBLICATIONS

Knappmeyer et al: "Adaptive Data Scheduling for Mobile Broadcast Carousel Services"; IEEE Publication, Apr. 22, 2007, pp. 1011-1015.

Gubbi: "Multimedia Streams and Quality of Service in the Next Generation Wireless Home Netwrks"; IEEE Int'l Workshop on Mobile Multimedia Comm., San Diego, CA Nov. 15-17, 1999.

Kim et al: "An Effective Resource Management for Vanable Bit Rate Video-On-Demand Server" 23rd Euromicro Conference; Budapest, Sep. 1-4, 1997, pp. 74-49.

Tong et al: Blind and Semiblind Channel Equlaization for Wireless Broadcast Channels. Cornell University, Ithaca. NY, IEEE Oct. 2, 2007 Abstract.

PU070301CN SR Eng TR dated Jul. 9, 2012.

PU070301CN SR original dated Jul. 9, 2012.

PU070301US Non-final rejection dated Mar. 23, 2010.

PU070301 WIPO SR dated Sep. 24, 2008.

Hu et al., "A Comparison of Indexing Methods for Data Broadcast on the Air", Jan. 21, 1998.

Kjeldsberg et al., "Data Dependency Size Estimation for Use in Memory Optimization", IEEE Transactions on computer-Aided Design of Integrated Circuits and Systems, vol. 22, No. 7, Jul. 1, 2003.

Lo et al., Optimal Index and Data Allocation in Multiple Broadcast Channels, Feb. 29, 2000.

Salkintzis et al., An Outband Paging Protocol for Energy-Efficient Mobile Communications, IEEE Transactions on Broadcasting, vol. 48, No. 3, Sep. 1, 2002.

US Office Action for U.S. Appl. No. 12/310,506 dated 22 Mar. 2012.

IP Datacast Over DVB-H: Electronic Service Guide (ESG), "Dvb Digital Video Broadcasting," DVB Documetn A099, Nov. 2005, 89 pages.

en_wikipedia.org/wiki/EPG_Wikipedia_Electronic Program Guide_accessed Aug. 16, 2013.

Paila, t., et al "Flute-File Delivery Over Unidirectional Transport," RFC 3926, Oct. 2004, pp. 1-35.

Handley, M., et al., SDP: Session Description Protocol, RFC4566, The Internet Society, Jul. 2006, pp. 1-49.

Non-final rejection dated Mar. 23, 2010.

CN Search Report for related CN Appln 2007801018585 dated Jul. 9, 2012.

Jean-Pierre Evain et al., "TV-Anytime Phase 1—a decisive milestone in open standards for Personal Video recorders," EBU Technical Review, Jul. 2003.

U.S. Notice of Allowance for related U.S. Appl. No. 12/735,110 dated Nov. 25, 2015.

\* cited by examiner

APPARATUS AND METHOD FOR SIMULCAST OVER A VARIABLE BANDWIDTH CHANNEL

CROSS-REFERENCE TO RELATED APPLICATION(S)

This application is a division of application Ser. No. 12/735,008, which is the national stage of International Application No. PCT/US2007/025685 filed 14 Dec. 2007. Thus, this divisional application claims the benefit, under 35 U.S.C. §365, of International Application PCT/US2007/025685, filed 14 Dec. 2007, which was published in accordance PCT Article 21(2) on 25 Jun. 2009, in English.

BACKGROUND

1. Technical Field

The following principles of the present invention relate to data transmission. More particularly, they relate to the transmission of simulcast data over a variable bandwidth channel.

2. Description of Related Art

Content services are provided by a spectrum of different suppliers. For example, residential digital video services may include digital television, Video on Demand (VOD), Internet video streaming, etc., each service typically providing audio-video data displayable at different encoded levels.

Content data is transmitted in a bitstream, or a continuous sequence of binary bits used to digitally represent compressed multimedia, e.g., video, audio, data. The bitstream is transmitted over a transmission channel. When content data is sent as a continuous bitstream, a client device buffers this stream and offers a real time playback of the same.

Mobile broadcast networks are challenging environments in which to deliver audio/video content. The bandwidth available over a connection at any particular instant varies with both time and location. This variation in bandwidth causes entire packets containing substantial audio/video content to be lost. In addition, the latency through the network, causing the video that is ultimately displayed to 'jitter' or lose clarity at the client. These factors may be tolerable for file transfer traffic where jitter does not matter since high level protocols correct for errors and losses.

In streaming real time live content live broadcast networks, methods already exist where transmission of audio-video content varies as a function of available network bandwidth. Depending on the bandwidth available, the head end or transmitter side of the service is able to either buffer data to send them at a different time or at real time, using an encoder to vary the content stream's compression parameters so that it can be transmitted at current available bandwidth.

Operators providing live televised services, stream in real-time, a lower quality version of a televised broadcast feed to its mobile customers. For example mobile operators like Verizon and Sprint provide live TV services, e.g., VCast Live TV, MobiTV, etc., at a reduced resolution and bitrates to mobile handsets using their services.

SUMMARY

According to an aspect of the present principles, the method for providing data over a network of devices includes establishing a bandwidth value for providing a data over a communication channel, providing the bandwidth value to a client device over the communication channel, and providing a predetermined version of the data over the communication channel to the client device in response to a comparison of the established bandwidth value with a bandwidth threshold. Providing data may include transmitting data via a wireless connection or providing data via a wired connection.

According to another aspect, the bandwidth can be established by estimating the available bandwidth, or could be established by setting an initial value of the bandwidth.

A bandwidth threshold is set based on the established threshold, and according to one implementation, the bandwidth threshold can be set as one half the established bandwidth value.

In accordance with another aspect, a low compression version of the data is transmitted when the bandwidth is higher than the bandwidth threshold, and a high compression version of the data is transmitted when the bandwidth is lower than the bandwidth threshold.

According to another implementation, the apparatus includes a head end scheduler configured to establish a bandwidth value for transmitting data over a communication channel, transmit the established bandwidth value to a client device, and transmit a predetermined version of the data in response to a comparison between the established bandwidth value and a bandwidth threshold.

According to a further implementation, the present principles are embodied in a computer program product having a computer useable medium having computer readable program code embodied thereon for use in communicating data over a communication channel. The computer program product includes program code for establishing a bandwidth value for transmitting the data over the communication channel, program code for transmitting the established bandwidth value to a client device over the communication channel, and program code for transmitting a predetermined version of the data over the communication channel to the client device in response to a comparison between the established bandwidth value and a bandwidth threshold.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

Figure 1:
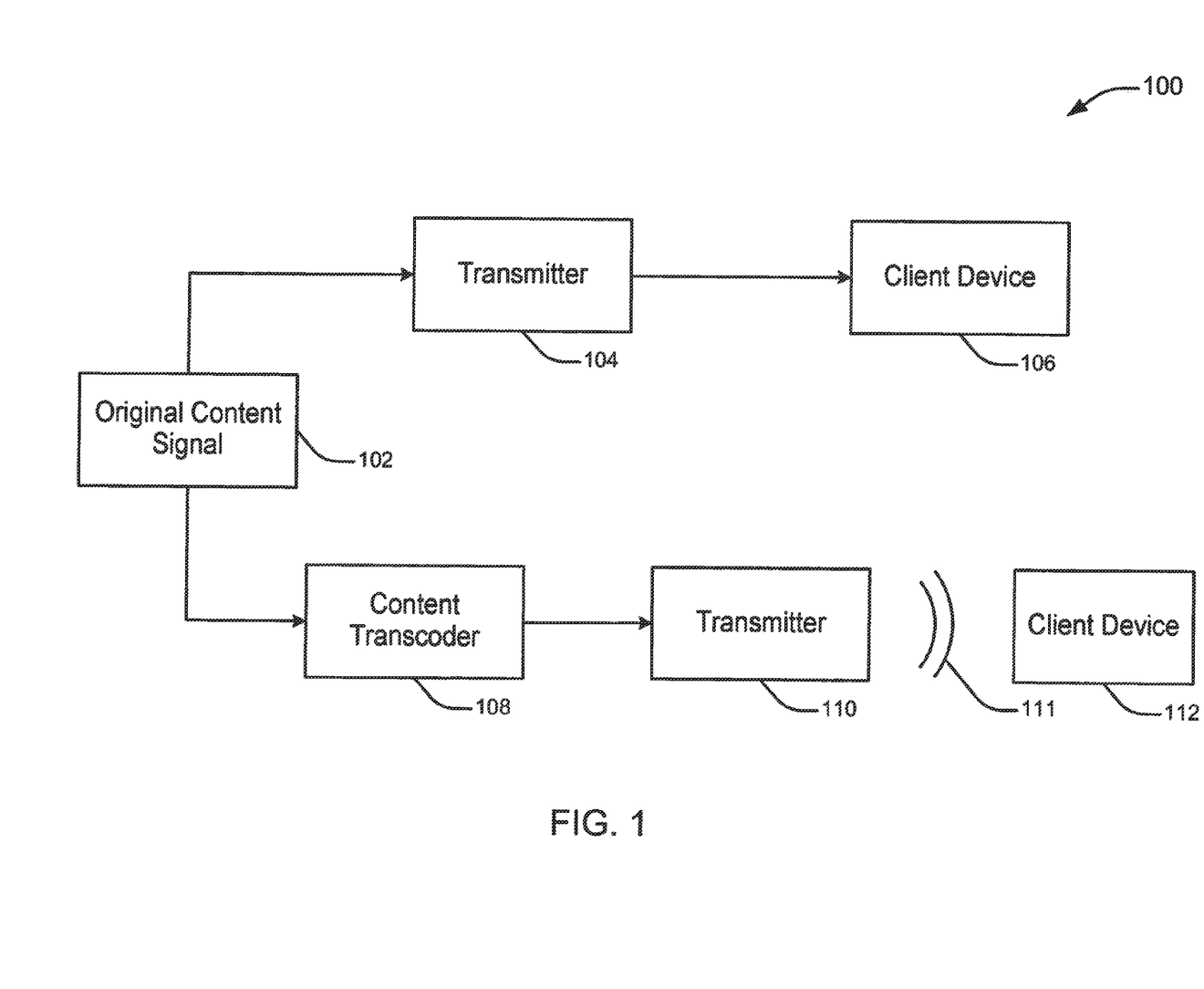
FIG. 1 is block diagram of a typical broadcast network adapted for mobile broadcast.

FIG. 1 shows a typical broadcast network system 100 adapted for mobile broadcast. The original content signal 102 is sent through a content transcoder 108 which compresses the audio-video content fit for transmission (110) over a mobile network 111 to a mobile client 112. In an on-demand device (e.g., Verizon Vcast service), users are allowed to stream multimedia files to their respective devices. In these services, the server sends out a transcoded version of the content, with the bandwidth of the transcoded version determined so as to not exceed the bandwidth offered to the user over a unicast channel when it is requested by the user. With networked streaming of video or other multimedia, the instantaneous bandwidth of the compressed video at any point in time is limited to the available network bandwidth, within the bounds of a buffer at the client, in order to maintain continuous video playback. If the instantaneous bandwidth exceeds the available bandwidth, playback at the client is disrupted.

When compressed multimedia is transmitted as files, rather than streamed, the bandwidth of the compressed multimedia does not need to be matched to the network bandwidth. The transmission time for the multimedia file does not need to correspond to the duration of the content of the multimedia file.

On-demand services consume bandwidth for each individual user, which is usually a very costly operation since it does not scale very well for large number of subscribers to the service. Although these practices bring down the bandwidth consumption, in most cases it need not necessarily be optimal for network and client device operations.

Figure 2:
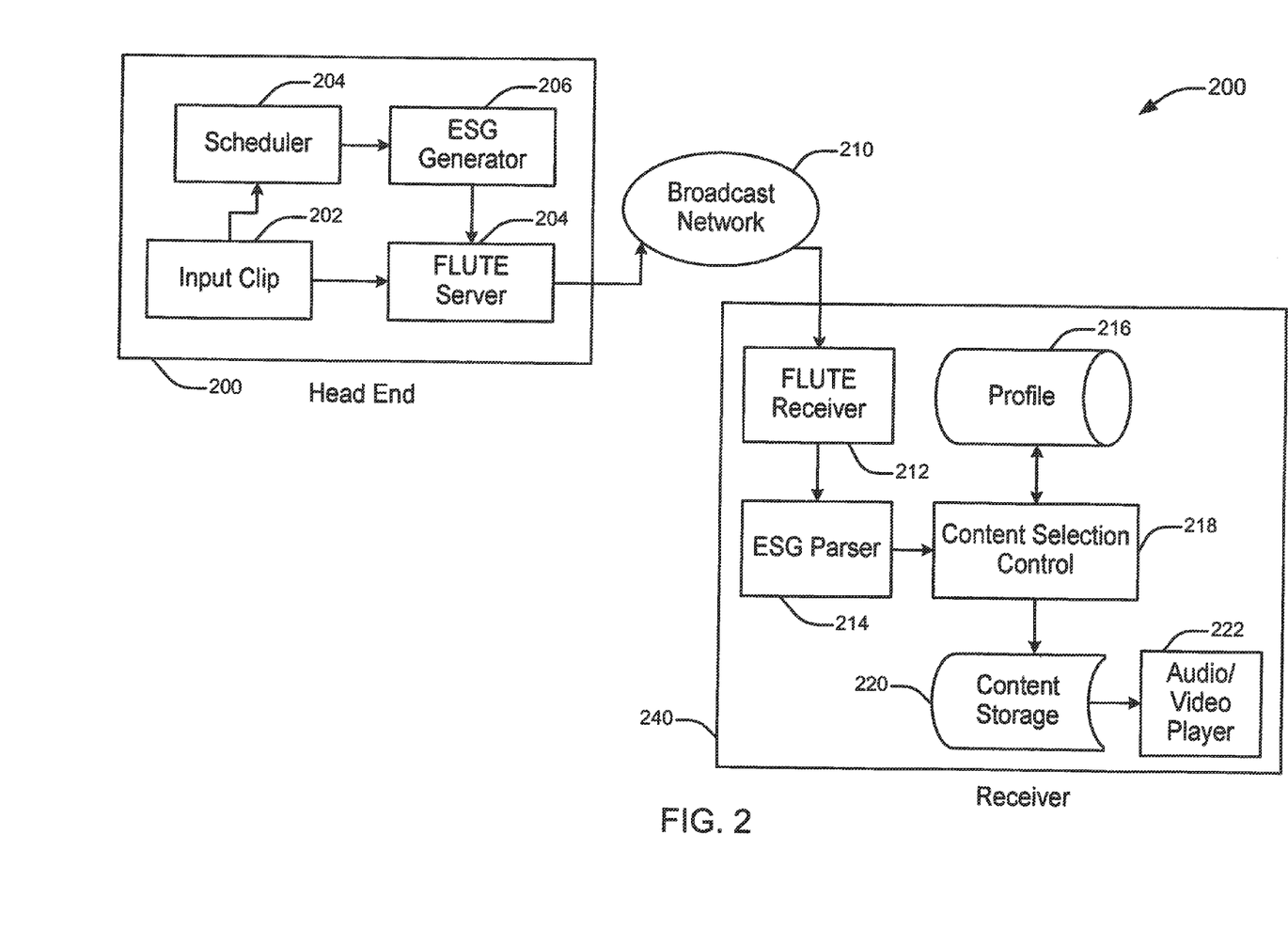
FIG. 2 is a block diagram of an exemplary personalized content broadcast system.

FIG. 2 shows a block diagram of a personalized broadcast video system 200, which provides simple user interface for personalization, while efficiently using network bandwidth and minimizing receiver battery device usage. The system 200 includes a head end 200, a broadcast network 210 and a receiver 240. The head end includes an input clip 202, a scheduler 204, an electronic service guide (ESG) generator 206 and a FLUTE server 208. The receiver includes a FLUTE receiver 212, and ESG parser 214, a content selection control 218, a user profile 216, a content storage device 220, and an audio/video player 222.

The user profile 216 on the receiver device 240 indicates the interests of the user. Individual clips 202 to be broadcast are associated with flexible metadata tags, such as keywords, are sent to the ESG generator 206 through the scheduler 204. When content, particularly video programs, is broadcast, the receiver device 240 selects individual programs to record based upon calculating a score corresponding to the program. The score is calculated for a particular piece of content using the ESG content keywords and the user's profile, which indicates a user's level of interest in particular keywords. The user's profile 216 can adapt based upon the user's viewing activity.

In an opportunistic bandwidth environment (i.e., Variable Bit Rate), the output channel bandwidth is not constant. This affects all the broadcast timing calculations for each content file done by the scheduler 204. Hence, to provide a reliable schedule of broadcast, the scheduler 204 needs to schedule broadcast of content files in a timely manner, based on available bandwidth and its own estimates of available bandwidth.

The scheduler 204 periodically outputs a schedule for content file broadcasts. This schedule is in the form of an ESG is communicated to a client device. In a unidirectional broadcast environment, the receiver 240 depends heavily on the schedule and meta-data information it gets for selective reception of the content. It is important that the client receive the schedule in advance of the actual broadcast time. The schedule broadcast by the server 208 contains meta-data information such as broadcast times for each content. The broadcast timing information is important to the client, since a client can use this information to selectively switch on and off its receiver components based on the broadcast times of different content, and hence make selective reception of content viable. Also, since the client is switching its receiver components on only when needed, there is efficient user of the client's power resources.

The scheduler 204 has a transmission monitor system (not shown) which controls the transmission of content files according to the schedule. The transmission monitor system updates the scheduler 204 with transmission status of each clip and variations in output channel speed.

According to the present invention, users of broadcast content services, such as those using the above-described systems, may receive content with varying compression formats depending on the bandwidth at the time the content was scheduled to be broadcast. In such systems, the content files are also scheduled to be re-broadcast as decided by the scheduler. If during the re-broadcast the amount of bandwidth is sufficiently high, then the scheduler may choose to broadcast a higher quality format of the content file.

By way of example, consider an audiovisual content Clip A is transcoded into two different compression formats, ClipA_lowComp and ClipA_highComp, with higher and lower bandwidth usages, respectively. The operator provides a number of live television services that generally use up most of the available bandwidth.

Figure 3A:
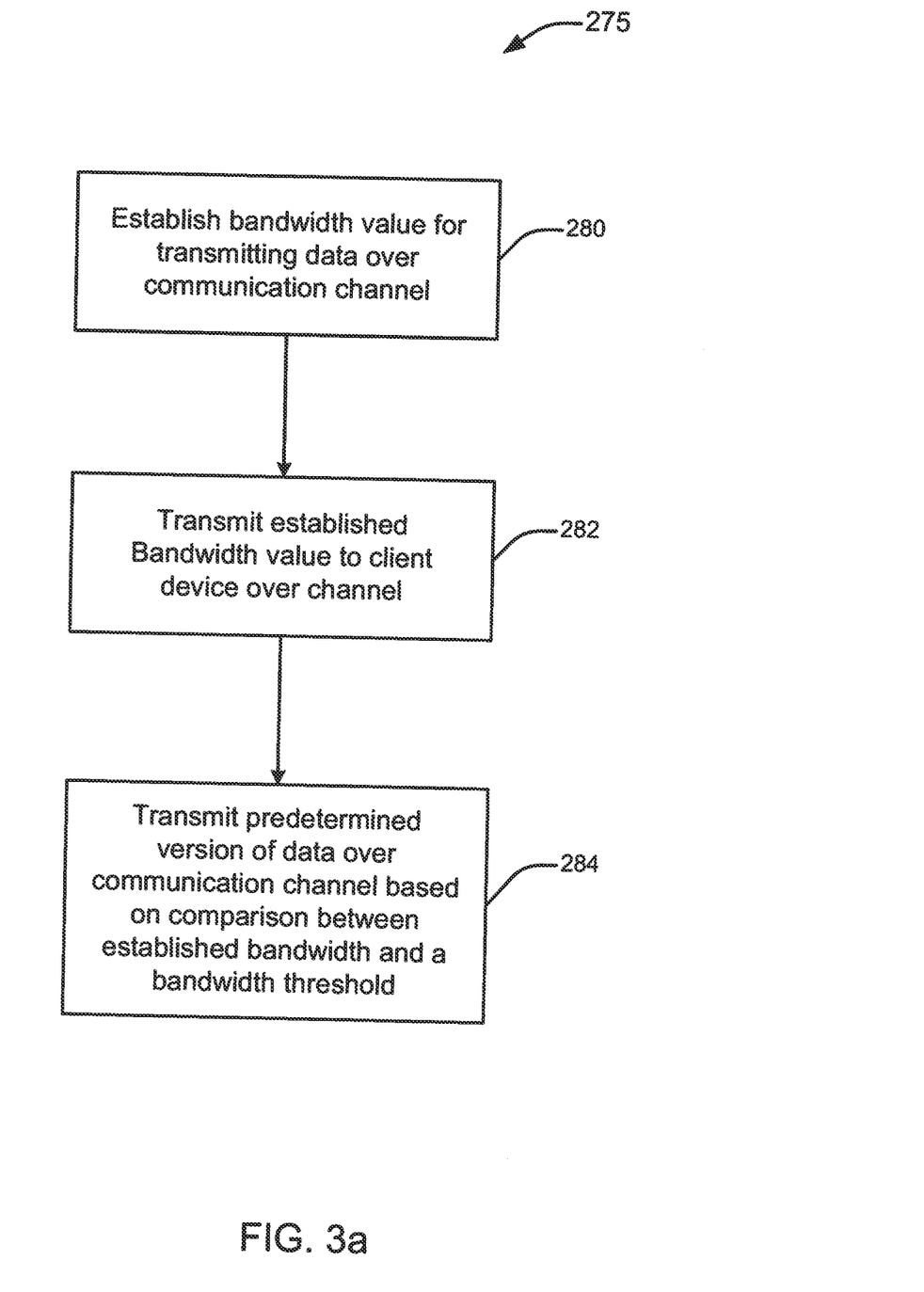
FIG. 3a is a block diagram of the method according to an implementation of the present principles.

Referring to the exemplary implementation shown in FIG. 3a, there is shown the method 275 according to an implementation of the present principles. Initially, the bandwidth of a communication channel is established (280). Those of skill in the art will recognize that there are many different methods for establishing the bandwidth of a communication channel. It is to be understood that the present principles can be applied using any suitable method for establishing the bandwidth of the channel. Once established, the bandwidth information is transmitted (282) to the client device over the communication channel. At this point, a version of the data is transmitted (284) over the communication channel in response to a comparison between the established bandwidth and a bandwidth threshold.

Figure 3B:
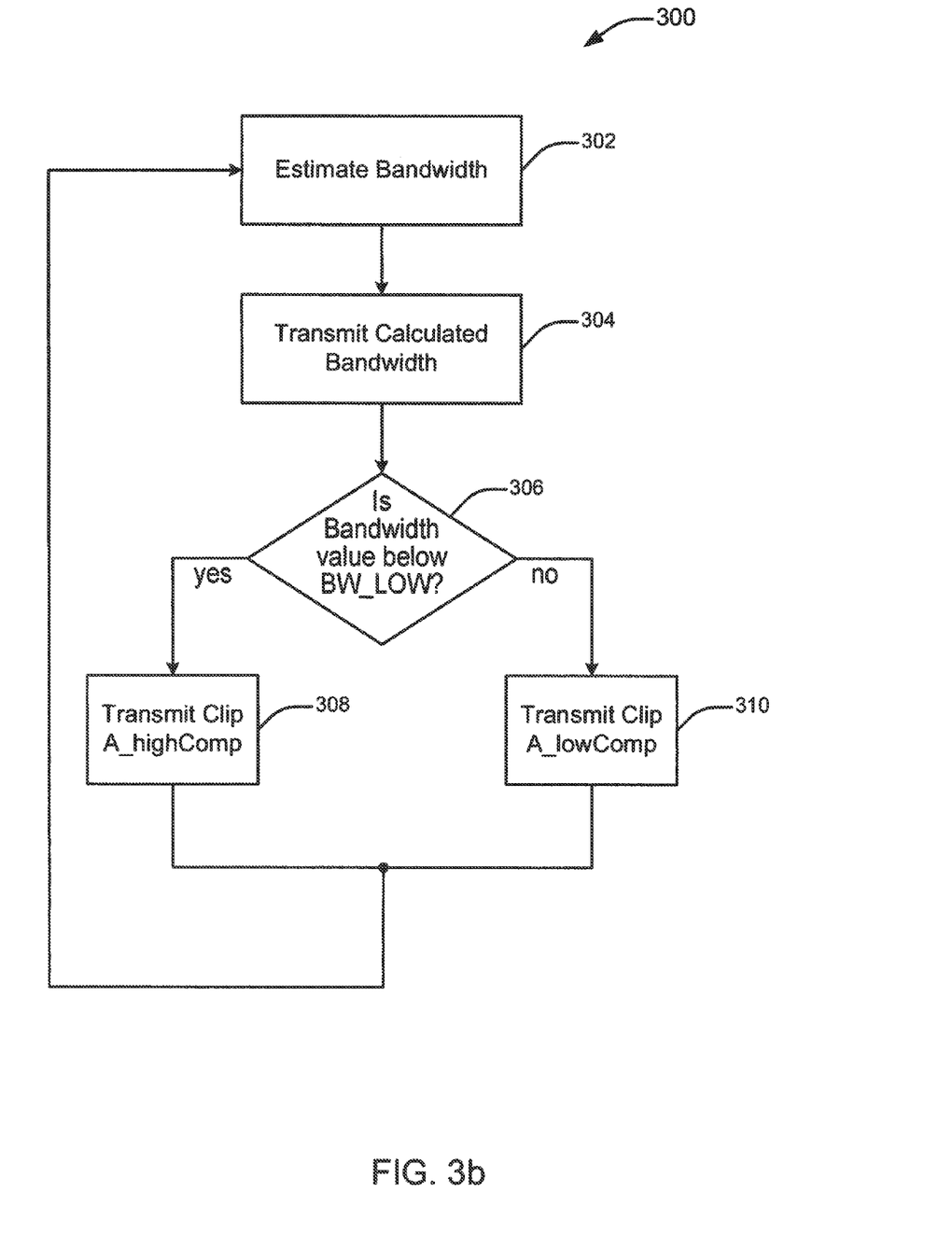
FIG. 3b is a flow diagram of the method according to an implementation of the present principles.

FIG. 3b shows the method 300 according to an implementation of the present principles. Initially, the scheduler 204 processes its database of content files and decides to output a schedule based on current estimates of bandwidth (302). The schedule is then transmitted (304) to a client device 240. The client device now has an estimate of the times when each content file is going to be broadcast. Based on this information, the client can optimize its receiver routines.

Before the broadcast of each file, the scheduler 204 of the service can be configured with an initial value of the bandwidth, or can be configured to make an estimate of the available bandwidth (302).

According to one implementation, the bandwidth thresholds can be established as being half of the initial value or estimated value of the bandwidth. If at the beginning, the bandwidth threshold is at a high value, BW_HIGH, the scheduler 204 would choose to broadcast ClipA_lowComp which is of lower compression and hence higher quality but with more bandwidth usage. If during some time elapse, the bandwidth allocated to the service changes, the schedule would be affected. The scheduler would normally detect this through its transmission control module. For example, if the bandwidth of the channel now fell to a lower threshold value, BW_LOW, the scheduler detects that change in the bandwidth, which now affects the schedule of its content file broadcasts. This is the example shown in FIG. 3.

The scheduler 204, instead of re-scheduling all of its content files, will now choose to broadcast ClipA_highComp (308), which is highly compressed version of the content file whose quality and bandwidth usage may be lower but acceptable to the user. If the bandwidth at a later point of time increases to a value BW_HIGH, and content file Clip A is scheduled for a re-broadcast, then this time around the scheduler changes the threshold in the decision block 306 and would choose to broadcast Clip A_lowComp (310) and the client on receiving this content could potentially detect this as a higher quality version of a previous file and choose to replace the lower quality content file, ClipA_highComp.

The scheduler 204 chooses the version of the file to be broadcast so that it would still maintain the timeliness of its schedule. The client, hence, sees no change in the schedule although there was a change in the bandwidth that was allocated to the service. In this manner, the client device sees a seamless operation of the service.

Figure 4:
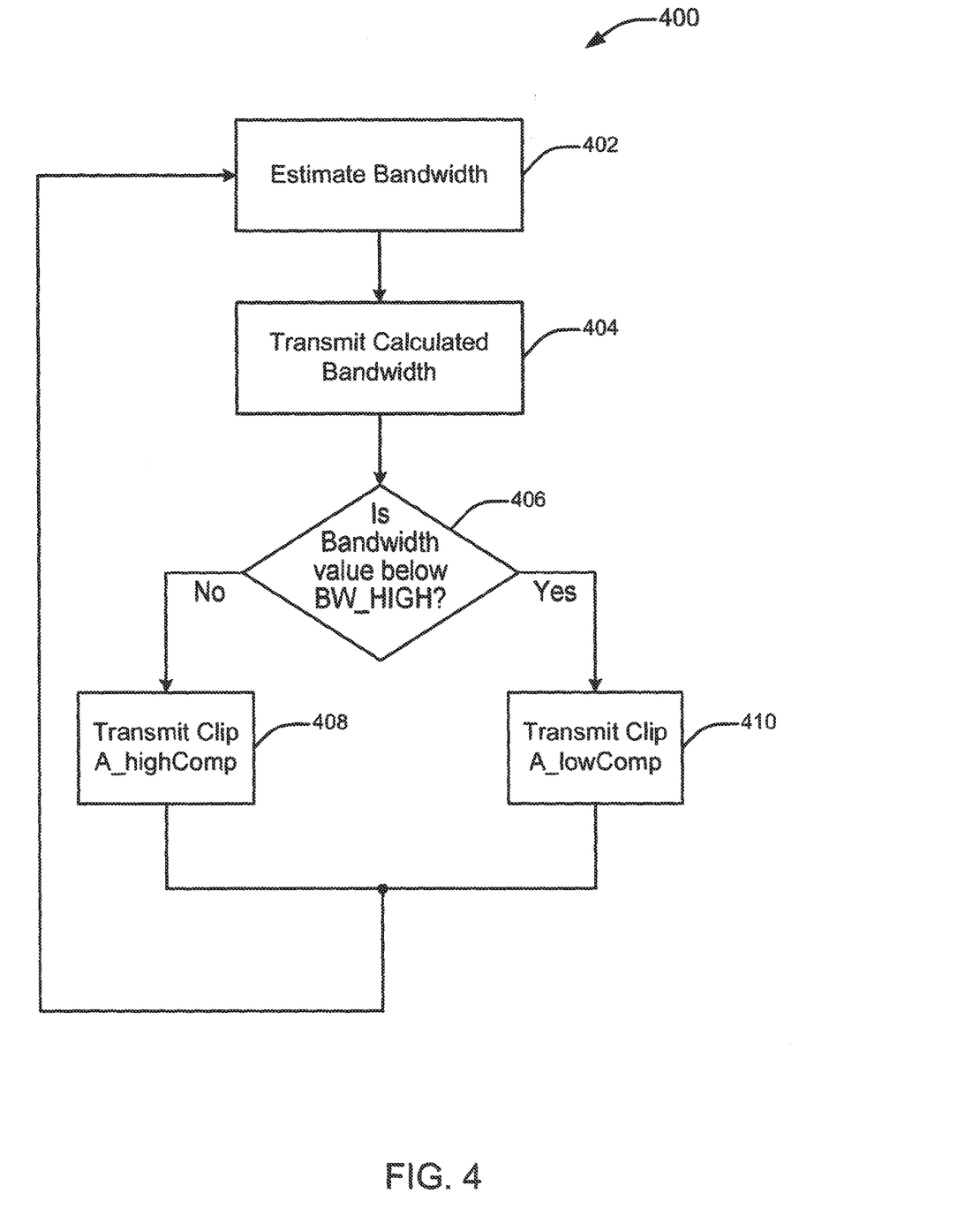
FIG. 4 is a flow diagram of the method according to another implementation of the present principles.

FIG. 3 shows the example where the threshold determination of decision block 306 is BW_LOW. Those of ordinary skill will recognize that changing the threshold from BW_LOW to BW_HIGH will reverse the "yes" and "no" decisions of the shown implementation. This is shown, by way of example, in the flowchart of FIG. 4. Here, the steps 402, 404, 406 all correspond to the same steps 302, 304, 306, respectively. When the bandwidth threshold is above BW HIGH, (otherwise, a "no" determination), the A_highComp clip is transmitted 408. When the bandwidth threshold is below BW_HIGH, the A_lowComp clip is transmitted 410.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present principles is programmed. Given the teachings herein, one of ordinary skill in the related art will be able to contemplate these and similar implementations or configurations of the present principles.

The invention claimed is:

1. A method comprising:
outputting periodically a schedule for a transmission of a plurality of multimedia contents to a client receiver over a unidirectional data communication channel;
transmitting said schedule to said client receiver over said communication channel before said transmission of said plurality of multimedia contents, said schedule including a metadata indicating a plurality of broadcast times for respective ones of said plurality of multimedia contents for selectively activating said client receiver in accordance with said plurality of broadcast times;
comparing first and second available bandwidths of said communication channel at respective ones of first and second points in time;
selecting one multimedia content file of a given compression level for transmission in response to a change of available bandwidth of said communication channel between said first and second points in time so that said plurality of multimedia contents may be received at said client receiver in accordance with respective ones of said plurality of broadcast times; and
transmitting said selected multimedia content file to said client receiver, wherein said transmission of said selected multimedia content file is a re-transmission of a previously-transmitted content at a different compression level.

2. The method of claim 1, wherein
said multimedia file includes at least one of video and audio contents.

3. The method of claim 1, wherein
said data communication channel includes at least one of wired and wireless connection paths.

4. An apparatus comprising:
a scheduler including a transmission monitor operative to output a schedule periodically for a transmission of a plurality of multimedia contents to a client receiver over a unidirectional data communication channel,
said schedule including a metadata indicating a plurality of broadcast times for respective ones of said plurality of multimedia contents; and
a server coupled to said scheduler operative to transmit said schedule to a client receiver over said communication channel before a transmission of said plurality of multimedia contents for selectively activating said client receiver in accordance with said plurality of broadcast times,
said transmission monitor operative to control said server for a transmission of said plurality of multimedia contents to said client receiver over said communication channel in accordance with said schedule,
said transmission monitor operative to compare first and second available bandwidths of said communication channel at respective ones of first and second points in time,
said scheduler operative to select one multimedia content file of a given compression level for transmission in response to a change of available bandwidth of said communication channel between said first and second points in time so that said plurality of multimedia contents may be received at said client receiver in accordance with respective ones of said plurality of broadcast times,
said server operative to transmit said selected multimedia content file to said client receiver, wherein said transmission of said selected multimedia content file is a re-transmission of a previously-transmitted content at a different compression level.

5. The apparatus of claim 4, wherein
said multimedia file includes at least one of video and audio contents.

6. The apparatus of claim 4, wherein
said data communication channel includes at least one of wired and wireless connection paths.

* * * * *